(12) United States Patent
Tang

(10) Patent No.: US 8,717,464 B2
(45) Date of Patent: May 6, 2014

(54) INCREASED LOW LIGHT SENSITIVITY FOR IMAGE SENSORS BY COMBINING QUANTUM DOT SENSITIVITY TO VISIBLE AND INFRARED LIGHT

(75) Inventor: Sui Tong Tang, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 262 days.

(21) Appl. No.: 13/366,443

(22) Filed: Feb. 6, 2012

(65) Prior Publication Data

US 2012/0200734 A1  Aug. 9, 2012

Related U.S. Application Data

(60) Provisional application No. 61/441,052, filed on Feb. 9, 2011.

(51) Int. Cl.
| H04N 5/33 | (2006.01) |
| H04N 5/217 | (2011.01) |
| H04N 9/083 | (2006.01) |
| H04N 3/14 | (2006.01) |
| H04N 5/335 | (2011.01) |
| H04N 9/04 | (2006.01) |

(52) U.S. Cl.
USPC ............ 348/241; 348/164; 348/273; 348/279

(58) Field of Classification Search
CPC ... H04N 5/2173; H04N 5/235; H04N 5/2351; H04N 5/2355; H04N 5/332; H04N 5/351
USPC .............. 348/164, 241–2, 273, 279
See application file for complete search history.

(56) References Cited

U.S. PATENT DOCUMENTS

| 7,129,462 | B2 | 10/2006 | Hogan et al. | |
| 7,623,167 | B2 * | 11/2009 | Sasaki | 348/273 |
| 7,773,404 | B2 | 8/2010 | Sargent et al. | |
| 8,411,176 | B2 * | 4/2013 | Katagiri et al. | 348/278 |
| 2003/0093805 | A1 * | 5/2003 | Gin | 725/105 |
| 2007/0183657 | A1 * | 8/2007 | Kidono et al. | 382/162 |
| 2009/0152664 | A1 | 6/2009 | Klem et al. | |

(Continued)

OTHER PUBLICATIONS

G. Li and K. Wang, An Efficient Natural-Looking Color Fusion Method of Infrared and Visible Images, 2006 IEEE Region 10 Conference, Hong Kong, Nov. 2006.*

(Continued)

Primary Examiner — Daniel M Pasiewicz
(74) Attorney, Agent, or Firm — Bereskin & Parr LLP/S.E.N.C.R.L., s.r.l.

(57) ABSTRACT

A camera unit generates a processed digital image by augmenting color image data with infrared image data according to the level of ambient light exposure. The camera has an ambient light sensor that detects the level of ambient light in the camera unit and an image sensor that provides image data. One or more quantum dot layers may be included in the image sensor. A camera controller adapts the camera unit for operation in different modes that are selectable based on the levels of detected ambient light. The image data is processed into a digital image, according to the selected mode of operation for the camera unit, using color image data only when the level of ambient light is high, but augmenting the color image data with infrared image data when the level of ambient light is low to increase the color luminance of the final processed digital image.

29 Claims, 6 Drawing Sheets

(56) References Cited

U.S. PATENT DOCUMENTS

| | | | |
|---|---|---|---|
| 2010/0187404 A1 | 7/2010 | Kelm et al. | |
| 2010/0289885 A1* | 11/2010 | Lu et al. | 348/61 |
| 2010/0309315 A1* | 12/2010 | Hogasten et al. | 348/164 |
| 2011/0019004 A1* | 1/2011 | Ohmori et al. | 348/164 |
| 2011/0063451 A1* | 3/2011 | Kamon et al. | 348/164 |
| 2011/0134293 A1* | 6/2011 | Tanaka | 348/280 |
| 2011/0293179 A1* | 12/2011 | Dikmen et al. | 382/167 |

OTHER PUBLICATIONS

F. Sun et al., A New Color Image Fusion Method for Visible and Infrared Images, IEEE International Conference on Robotics and Biomimetics, Sanya, China, Dec. 2007.*

Q. Zhang and B Guo, Infrared and Color Visible Images Fusion Based on Second Generated Curvelet Transform, 2nd IEEE Conference on Industrial Electronics and Applications, Harbin, China, May 2007.*

X. Zhang et al., Comparison of Fusion Methods for the Infrared and Color Visible Images, 2nd IEEE International Conference on Computer Science and Information Technology, Beijing, China, Aug. 2009.*

X. Zhang et al., Fusion of the Infrared and Color Visible Images Using Bidimensional EMD, International Conference on MultiMedia and Information Technology, Three Gorges, China, Dec. 2008.*

* cited by examiner

ID DOT SENSITIVITY TO VISIBLE
INCREASED LOW LIGHT SENSITIVITY FOR IMAGE SENSORS BY COMBINING QUANTUM DOT SENSITIVITY TO VISIBLE AND INFRARED LIGHT

CROSS-REFERENCE TO RELATED APPLICATION

This application claims priority to U.S. Provisional Patent Application No. 61/441,052, filed Feb. 9, 2011, the content of which is hereby incorporated by reference.

FIELD

Embodiments described herein relate generally to a method and system for operating an imaging device, such as a camera or video module, having increased low light sensitivity by combining quantum dot sensitivity to visible and infrared light.

BACKGROUND

Digital photography is a form of photography that uses an image sensor formed out of an array of photosensitive pixels to capture scene images. As opposed to film photography, which exposes light sensitive film, digital photography uses the photosensitive pixels to convert light photons into accumulated charge. Typically each pixel is also designed to be photosensitive to only a certain range of light, which in most cases corresponds approximately to red, green or blue light. One or more color filter layers and an infrared cutoff filter is commonly used to achieve selective photosensivity to different ranges of light.

An image processor linked to the image sensor then determines corresponding intensities of each raw color component (e.g., red, green and blue) by measuring the amount of accumulated charge in each type of pixel. In some cases, demosaicing of the raw color components is also applied to generate full color images. Accordingly, pixels in the resulting digital image are represented by a plurality of color component values, which may be red, green and blue color components, although other digital color representations exist as well. Digital videography is a form of image capture related to digital photography, but that works on moving as opposed to still images.

BRIEF DESCRIPTION OF DRAWINGS

For a better understanding of the described embodiments and to show more clearly how they may be carried into effect, reference will now be made, by way of example, to the accompanying drawings in which.

DETAILED DESCRIPTION OF EMBODIMENTS

Figure 1:
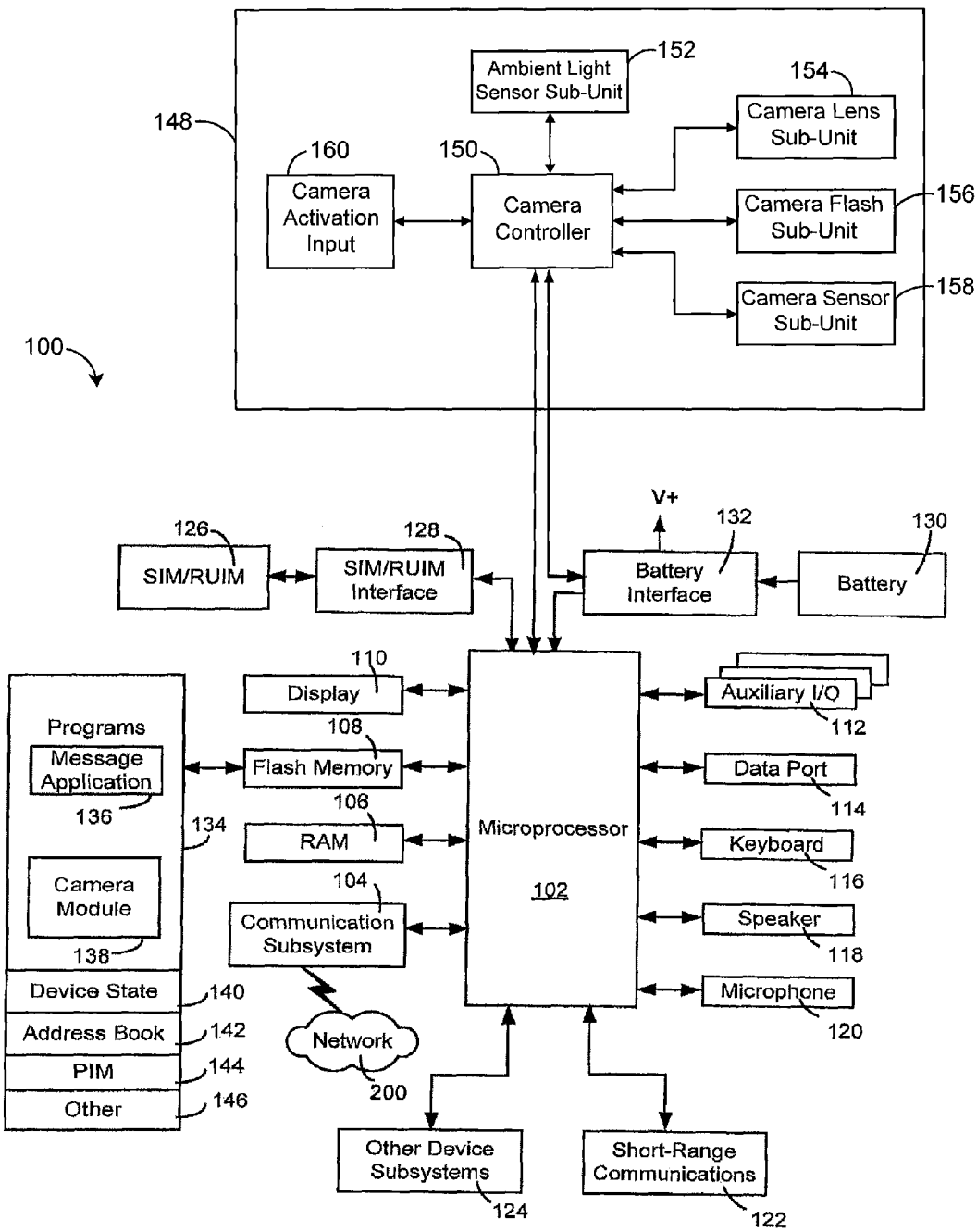
FIG. 1 is a block diagram of a mobile device having a camera unit in one example implementation.

Very little photon energy is present in the visible light spectrum when the level of ambient light is low enough. Consequently, electron accumulation in an image sensor for digital photography or videography may be low as well when the image sensor is operated under low light conditions. When that happens, the signal to noise ratio (SNR) of the resulting digital image or video may be inadequate and the quality of the digital image or video poor. Luminance noise and/or color noise may predominate in low light images and videos, leading to user dissatisfaction.

Quantum dot materials have generally higher light gathering efficiency, but particularly in the infrared light range, in comparison to other image sensor technologies, such as color-filter layered Charge Coupled Device (CCD) or Complementary Metal Oxide Semiconductor (CMOS) sensor arrays. In comparison to CMOS and CCD pixels, quantum dot materials are also capable of providing good spectral selectivity and sensitivity to visible light without the use of an infrared cutoff filter.

Accordingly, image sensors that incorporate quantum dot materials into the active pixel area of the image sensor may be sensitive to both visible and infrared light simultaneously. Detecting the intensity of infrared light, as well as the intensity of visible light, in an exposed scene image allows for some of the luminance and/or color noise associated with low ambient light conditions to be compensated. This in turn enables multi-mode mode operation of a digital camera unit based upon the amount of ambient light.

Specifically, in conditions of low ambient light, where the visible spectrum provides low SNR luminance data, it is common for the same scene appearing dark to visible light to be illuminated by comparably higher levels of infrared light. Accordingly, the detected levels of infrared light may be used to augment or otherwise compensate the noisy luminance data generated from the detected visible light. Together with color data (e.g., hue and saturation) generated from the detected visible light, the infrared luminance data may be used to render a final color image having a higher luminance SNR than was possible by detecting only visible light. Various techniques are possible for combining infrared and color image data to render a fused color image.

On the other hand, when the level of ambient visible light is high enough to produce a digital image or video having sufficient luminance SNR, the infrared light data detected by the image sensor is not required and may be discarded. In these situations of good (or "daytime") light, the camera unit may be operated in a way to generate digital and/or video images by processing only color image data according to more conventional techniques. So long as both infrared and visible light is detected, each mode of operation may be enabled depending on ambient light levels. Still other modes of operation for the imaging device, including manual modes of operation, may be defined as well.

In one broad aspect, the described embodiments relate to a control system for a camera unit to generate a processed digital image represented by a plurality of image pixels. The control system has an ambient light sensor sub-unit for generating an ambient light data signal representative of an intensity of ambient light detected in a vicinity of the camera unit.

A camera controller is used to adapt the camera unit to a mode of operation selected from a plurality of modes of operation defined for the camera unit in relation to the intensity of the detected ambient light. The plurality of modes of operation include a first mode of operation and a second mode of operation. A camera sensor sub-unit is coupled to the camera controller to receive a mode control signal generated by the camera controller indicating the selected mode of operation.

The camera sensor sub-unit has an image sensor comprising a plurality of pixels for providing image data, which may also be referred to as raw image data, representing a scene image exposed by the image sensor, in which the raw image data includes raw color image data and raw infrared image data. The camera sensor sub-unit also has an image sensor processor responsive to the mode control signal to process the raw image data into the processed digital image according to the selected mode of operation. For each image pixel of the processed digital image, the image sensor processor determines a plurality of processed color component values used to represent full colors in the processed digital image, (i) in the first mode of operation, based on the raw color image data without using the raw infrared image data, and (ii) in the second mode of operation, based on the raw color image data modified by the raw infrared image data.

In another broad aspect, the described embodiments relate to a method for controlling a camera unit to generate a processed digital image represented by a plurality of image pixels. The method includes detecting an intensity of ambient light in a vicinity of the camera unit, and receiving raw image data representing a scene image exposed by an image sensor, in which the raw image data includes raw color image data and raw infrared image data. The method also includes adapting the camera unit to a mode of operation selected from a plurality of modes of operation defined for the camera unit in relation to the detected ambient light intensity. The plurality of modes of operation comprising a first mode of operation and a second mode of operation.

The method further includes processing the raw image data into the processed digital image, using an image sensor processor, according to the selected mode of operation. For each image pixel of the processed digital image, the raw image data is processed into the processed digital image by determining a plurality of processed color component values used to represent full colors in the processed digital image, (i) in the first mode of operation, based on the raw color image data without using the raw infrared image data, and (ii) in the second mode of operation, based on the raw color image data modified by the raw infrared image data.

In another broad aspect, the described embodiments relate to a non-transitory computer-readable storage medium storing instructions executable by one or more processors coupled to the storage medium. When executed, the stored instructions program the one or more processors to control a camera unit to generate a processed digital image represented by a plurality of image pixels. The stored instructions include detecting an intensity of ambient light in a vicinity of the camera unit, and receiving raw image data representing a scene image exposed by an image sensor, in which the raw image data includes raw color image data and raw infrared image data. The stored instructions also include adapting the camera unit to a mode of operation selected from a plurality of modes of operation defined for the camera unit in relation to the detected ambient light intensity. The plurality of modes of operation comprising a first mode of operation and a second mode of operation.

The stored instructions further include processing the raw image data into the processed digital image, using an image sensor processor, according to the selected mode of operation. For each image pixel of the processed digital image, the raw image data is processed into the processed digital image by determining a plurality of processed color component values used to represent full colors in the processed digital image, (i) in the first mode of operation, based on the raw color image data without using the raw infrared image data, and (ii) in the second mode of operation, based on the raw color image data modified by the raw infrared image data.

These and other aspects of the described embodiments are described below.

To aid the reader in understanding the general structure and operation of the mobile device, reference will be made to FIGS. 1 to 3. However, it should be understood that embodiments of the mobile device are not limited only to that which is described herein. Examples of different mobile devices generally include any portable electronic device that includes a camera module such as cellular phones, cellular smartphones, wireless organizers, personal digital assistants, computers, laptops, handheld wireless communication devices, wireless enabled notebook computers, wireless Internet appliances, and the like. These mobile devices are generally portable and thus are battery-powered. However, the described embodiments are not limited only to portable, battery-powered electronic devices. While some of these devices include wireless communication capability, others are standalone devices that do not communicate with other devices.

Referring to FIG. 1, shown therein is a block diagram of a mobile device 100 in one example implementation. The mobile device 100 comprises a number of components, the controlling component being a microprocessor 102, which controls the overall operation of the mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that the new standards will have similarities to the network behaviour described herein, and it will also be understood by persons skilled in the art that the embodiment described herein is intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in one example implementation, other wireless networks can also be associated with the mobile device 100 in variant implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, the SIM card/RUIM 126 is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

The mobile device 100 is a battery-powered device and includes a battery interface 132 and uses one or more rechargeable batteries in a battery module 130. The battery interface 132 is coupled to a regulator (not shown), which assists the battery module 130 in providing power V+ to the mobile device 100. Alternatively, the battery module 130 can be a smart battery as is known in the art. Smart batteries generally include a battery processor, battery memory, switching and protection circuitry, measurement circuitry and a battery module that includes one or more batteries, which are generally rechargeable. In either case, the one or more batteries in the battery module 130 can be made from lithium, nickel-cadmium, lithium-ion, or other suitable composite material.

In addition to operating system functions, the microprocessor 102 enables execution of software applications 134 on the mobile device 100. The subset of software applications 134 that control basic device operations, including data and voice communication applications, will normally be installed on the mobile device 100 during manufacturing of the mobile device 100.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative implementation, all messages can be stored in a remote location while only recent messages can be stored on the mobile device 100.

The mobile device 100 further includes a camera module 138, a device state module 140, an address book 142, a Personal Information Manager (PIM) 144, and other modules 146. The camera module 138 is used to control camera operations for the mobile device 100, including selecting between a daytime mode of operation, a low light mode of operation, and a camera flash mode of operation. Additionally, the camera module 138 is used to control a maximum camera current that can be drawn from the battery module 130 without adversely affecting the operation of the mobile device 100, such as causing brown-out, reset, affecting the operation of any applications being performed by the mobile device 100 and the like.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

The mobile device 100 also includes a camera unit 148 that allows a user of the mobile device 100 to take pictures. The camera unit 148 includes a camera controller 150, an ambient light sensor sub-unit 152, a camera lens sub-unit 154, a camera flash sub-unit 156, a camera sensor sub-unit 158 and a camera activation input 160. The camera controller 150 configures the operation of the camera unit 148 in conjunction with information and instructions received from the microprocessor 102. It should be noted that the structure shown for the camera unit 148 and the description that follows is only one example of an implementation of a camera on a mobile device and that the technique of determining maximum flash current should not be limited to this particular example embodiment.

The camera controller 150 receives an activation signal from the camera activation input 160 when a user indicates that a picture is to be taken. In alternative embodiments, the microprocessor 102 receives the activation signal. Typically, the camera activation input 160 is a push-button that is depressed by the user when a picture is to be taken. However, the camera activation input 160 can also be a switch or some other appropriate input mechanism as is known by those skilled in the art. In alternative embodiments, the camera activation input 160 is used to initiate a camera mode on the mobile device 100 by executing the camera module 138 in the flash memory 108. A separate input device (not shown) may then be used to take pictures in the camera mode.

The camera controller 150 determines a particular camera mode of operation for the camera unit 148 based on detected ambient light conditions using ambient light sensor sub-unit 152. As will be discussed in more detail below, the camera unit 148 can be operated in each of a daytime mode, a low light mode and, if necessary, a camera flash mode of operation based on the output of the ambient light sensor sub-unit 152. However, these modes of operation are not limiting of the available modes of operation for the camera unit 148 and still other modes of operation are possible in variant embodiments.

Depending on the particular configuration that is employed, the camera lens sub-unit 154 includes a lens along with a shutter and/or aperture along with components to open and close the shutter and/or aperture to expose an image sensor in the camera sensor sub-unit 158. The shutter and/or aperture may be opened once upon actuation of the camera activation input 160. In some embodiments, the shutter and/or aperture stays open so long as the mobile device 100 is in the camera mode, in which case image data is continuously or semi-continuously generated. Alternatively, the shutter and/or aperture may be opened and closed each time a picture is taken so that images are exposed only once. Additionally, or instead of these components, the camera lens sub-unit 154 can include components that provide telescopic functionality to allow the user to take a "zoomed-in" or "zoomed-out" picture.

The camera flash sub-unit 156 includes a camera flash to generate light having an appropriate magnitude or lumen to increase the quality of the images that are obtained by the camera unit 148. In some cases, the light output of the camera flash sub-unit 156 can be limited by the maximum current draw available from the battery module 130 for flash purposes. For example, to avoid excessive "battery slump", a maximum camera flash current can be enforced. The camera flash sub-unit 156 is typically based on LED flash technology, but in some embodiments can also incorporate phosphor materials and/or quantum dot layers to adjust the spectral quality of the generated flash light. The camera flash sub-unit 156 can be operated in a camera flash mode of operation of the camera unit 148, while being deactivated in other modes of operation.

The camera sensor sub-unit 158 captures and processes raw image data using an image sensor, which is then processed in an image sensor processor to generate a processed digital color image. The image sensor can be fabricated using, for example, CMOS sensor technology, CCD sensor technology as well as other sensor technologies. The image sensor can incorporate pixels that are sensitive to light in different parts of the light spectrum. For example, some pixels are sensitive to visible light, while other pixels are sensitive to infrared light. The image sensor processor receives and processes the visible and infrared pixel data based upon the selected camera mode of operation to generate the processed digital image. Other functions can also be performed by the image sensor processor.

Figure 2:
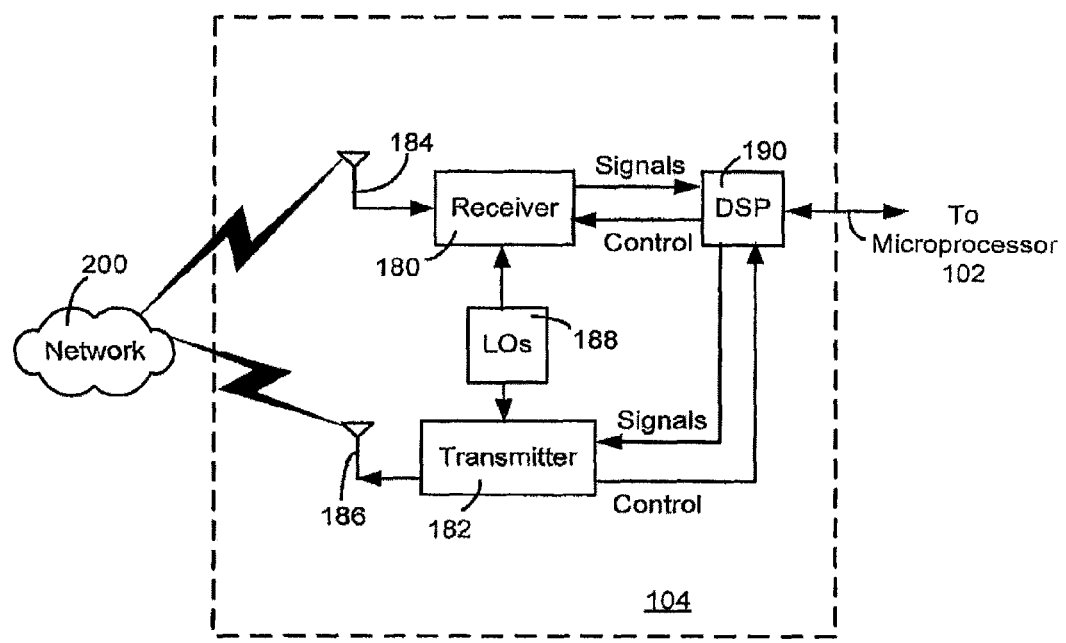
FIG. 2 is a block diagram of an example embodiment of a communication subsystem component of the mobile device shown in FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184, 186, Local Oscillators (LOs) 188, and a processing module such as a Digital Signal Processor (DSP) 190.

The particular design of the communication subsystem 104 is dependent upon the network 200 in which mobile device 100 is intended to operate, thus it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, and associated protocols used between the mobile device 100 and the network 200. An RF channel is a limited resource that must be conserved, typically due to limits in overall bandwidth and limited battery power of the mobile device 100.

When the mobile device 100 is fully operational, the transmitter 182 is typically keyed or turned on only when the transmitter 182 is sending to the network 200 and is otherwise turned off to conserve resources. Similarly, the receiver 180 is periodically turned off to conserve power until the receiver 180 is needed to receive signals or information (if at all) during designated time periods.

Figure 3:
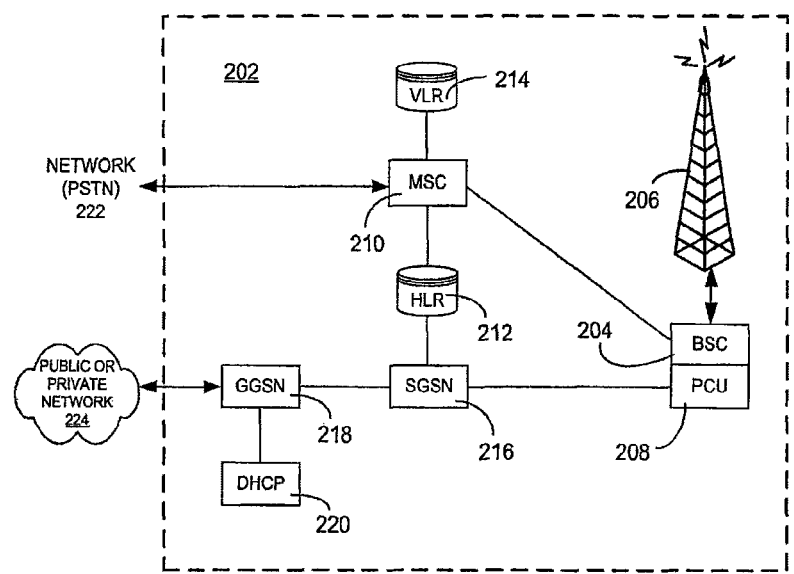
FIG. 3 is a block diagram of a node of a wireless network in one example implementation.

Referring now to FIG. 3, a block diagram of a node of a wireless network is shown as 202. In practice, the network 200 comprises one or more nodes 202. The mobile device 100 communicates with a node 202 within the wireless network 200. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within the cell via the station 206. The fixed transceiver equipment normally performs such functions as modulation and possibly encoding and/or encryption of signals to be transmitted to the mobile device in accordance with particular, usually predetermined, communication protocols and parameters, under control of a controller. The fixed transceiver equipment similarly demodulates and possibly decodes and decrypts, if necessary, any communication signals received from the mobile device 100 within the cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in the location areas in the VLR 214 for which the MSC 210 is responsible. Further the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that the mobile device 100 has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using the PDP Context allocated to the mobile device 100, the PDP Context can be de-allocated and the IP address returned to the IP address pool managed by the DHCP server 220.

Referring now generally to FIGS. 4-7, the multi-mode operation of the camera unit 148 is explained in greater detail. For convenience, the following embodiments of the camera unit 148 are described in the context of a camera unit for a mobile communication device, such as mobile device 100 shown in FIG. 1. However, it should be appreciated that the described embodiments are also suitable for other types and configurations of camera modules, including video camera modules, and are not necessarily limited just to still or video camera modules incorporated into mobile communication devices. For example, the described embodiments may be equally suited for stand-alone digital camera modules, video camera modules, and the like.

Figure 4:
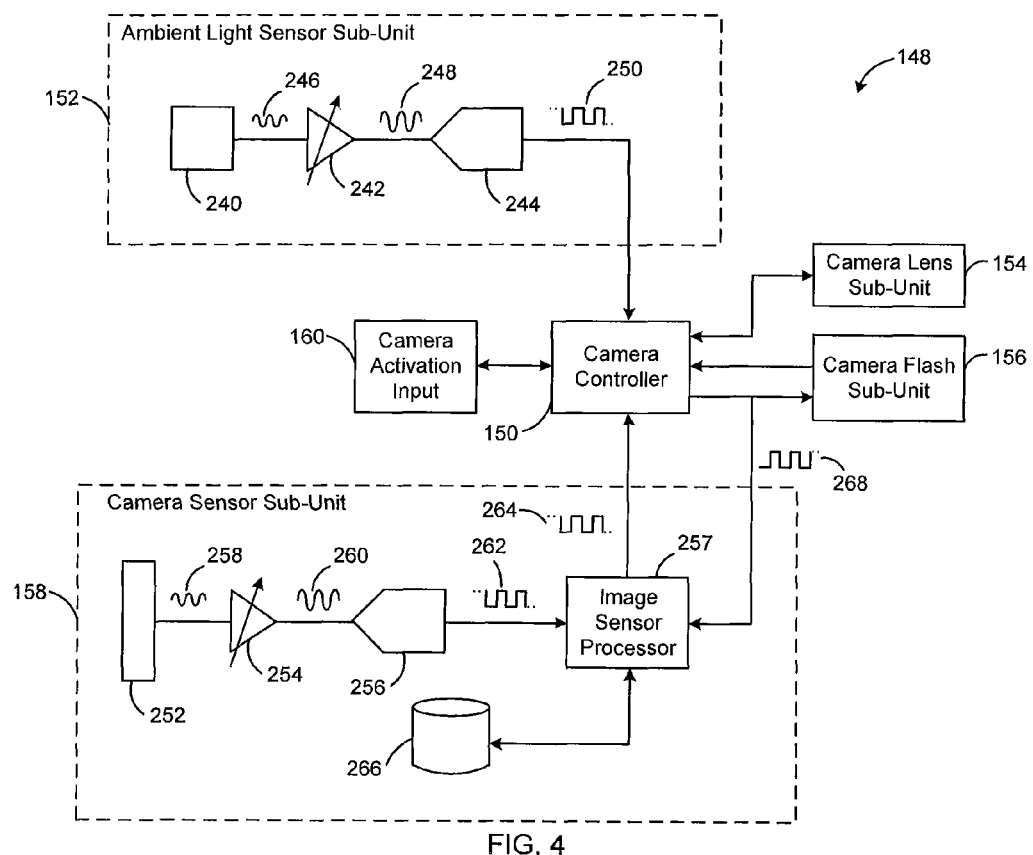
FIG. 4 is a block diagram of an example embodiment of the camera unit of the mobile device shown in FIG. 1.

As seen in FIG. 4, in one example implementation, the camera unit 148 includes a camera controller 150, an ambient light sensor sub-unit 152, a camera lens sub-unit 154, a camera flash sub-unit 156, a camera sensor sub-unit 158 and a camera activation input 160. While reference may be made in the following description primarily to the camera controller 150, the ambient light sensor sub-unit 152 and the camera sensor sub-unit 158, further description of the camera lens sub-unit 154, camera flash sub-unit 156 and camera activation input 160 is provided above with reference to FIG. 1.

The ambient light sensor sub-unit 152 includes ambient light sensor 240, variable gain amplifier (VGA) 242 and digital to analog converter (DAC) 244. The ambient light sensor 240 is used to estimate one or more characteristics, such as an intensity level, of the ambient light incident on or in the vicinity of the camera lens sub-unit 154 and that will be used to expose the scene. Different configurations of the ambient light sensor 240 are possible. For example, the ambient light sensor 240 may be implemented using a layer of photovoltaic material, such as selenium or silicon, which generates a voltage proportional to the ambient light intensity. Alternatively, the ambient light sensor 240 may be implemented using a photoresistive layer, such as cadmium sulfide, which changes electrical resistance proportional to light exposure.

In either case, the observed parameter (voltage or resistance) may be measured and correlated to a light intensity value used as an estimate of the detected ambient light intensity. For this purpose, the ambient light sensor 240 generates an ambient light detection signal 246 that provides a real-time indication of ambient light intensity, such that changing levels of ambient light intensity are communicated by proportionate changes in the level of the ambient light detection signal 246.

While the ambient light detection signal 246 may be continuously generated in some embodiments, in other embodiments the ambient light sensor 240 may be operated periodically or intermittently. For example, the ambient light sensor 240 may be configured to output the ambient light detection signal 246 only when the camera unit 148 is activated or operational. Alternatively, the camera controller 150 may instruct the ambient light sensor 240 to output the ambient light detection signal 246 only when the camera controller 150 receives the activation signal from the camera activation input 160, signaling that a picture or video is being taken.

The VGA 242 is connected to the ambient light sensor 240 and is used to amplify the level of the ambient light detection signal 246, thereby generating an amplified detection signal 248. The amount of gain provided by the VGA 242 is variable and may be adjusted corresponding to the particular implementation of the ambient light sensor 240. For example, selenium based light sensors may be less suited for detecting low light conditions in comparison to other silicon or cadmium sulfide based light sensors. Accordingly, the VGA 242 may provide a larger signal gain when a selenium based light sensor is incorporated into the camera unit 148.

The adjustable gain of the VGA 242 also provides a calibration mechanism for the ambient light sensor sub-unit 152. For example, the ambient light sensor 240 may be subjected to one or more known ambient light intensities under offline test conditions, and the signal gain of the VGA 242 adjusted until the amplified detection signal 248 matches expected levels to indicate that the test ambient light intensities are properly detected.

The amplified detection signal 248 is passed into the DAC 244 for signal digitization, e.g. through sampling and quantization. As will be appreciated, the DAC 244 may have different types or configurations depending on the application, such as pulse-width modulation, oversampling, delta-sigma and binary weighted digital to analog converters. Additionally, the DAC 244 may be realized using hardware components, software components or some combination of the two. The DAC 244 outputs an ambient light data signal 250, which is a digitized representation of the amplified detection signal 248. Together with the gain factor of the VGA 242, the ambient light data signal 250 is representative of the intensity of the ambient light detected by the ambient light sensor 240 in a vicinity of the camera unit 148.

The camera controller 150 receives and processes the ambient light data signal 250 for selection of a mode of operation for the camera unit 148. Different modes of operation are pre-defined for the camera unit 148. In some cases, a mode of operation may be selected manually by a user of the camera unit 148, while in other cases may be selected automatically by the camera controller 150 based upon the detected ambient light intensity (as communicated to the camera controller 150 by the level of the ambient light data signal 250). After selection of a mode, whether manually or automatically, the camera controller 150 then adapts the camera unit 148 for operation in the specified mode.

In the case of manual mode selection, the camera controller 150 may generate a graphic for display on an input/output interface (e.g. 112 in FIG. 1) of the camera unit 148. The displayed graphic is representative of the ambient light data signal 250 and provides a basis for the user of the camera unit 148 to decide upon a selected mode of operation. For example, the graphic may numerically display the level of detected ambient light. The displayed graphic may also characterize the level of the detected ambient light into one or more pre-set categories that are indicative of the level of ambient light, e.g. sunny, overcast, indoor, low. The input/output interface also receives input of the user's selection through any suitable selection tool, such as a button or switch.

The camera controller 150 may also suggest a mode of operation for the user based on the level of the ambient light data signal 250. The suggested mode of operation may be the same mode of operation that the camera controller 150 would automatically select for the camera unit 150, if the camera unit 148 were set for automatic mode selection by the camera controller 150. Automatic mode selection is described further below. However, the user is free to ignore the suggested mode of operation and to select any mode of operation for the camera unit 148 as desired by inputting the choice to the input/output interface.

In the case of automatic mode selection by the camera controller 150, the ambient light data signal 250 may be compared against one or more criteria for determining a suitable mode of operation. For example, each mode of operation pre-defined for the camera unit 148 may be associated with a corresponding range of ambient light intensities. The ranges of ambient light intensities corresponding to the different camera modes of operation may, optionally, be contiguous and non-overlapping. However, other characteristics of the ambient light that are represented by the ambient light data signal 250, such as color temperature, may also provide a basis for determining the camera mode of operation.

When the ambient light intensity level is determined to be within a range of light intensities associated with a specified mode of operation, the camera controller 150 then adapts the camera unit 148 for operation in the specified mode by generating suitable control signals for one or more sub-units of the camera unit 148, such as the camera sensor sub-unit 158 and/or the camera flash sub-unit 156. Each of these one or more sub-units are responsive to the control signals to operate differently and in a manner specific to the selected mode of camera operation.

Any number of different modes of operation may be pre-defined for the camera unit 148 and from which either a user or the camera controller 150 selects a particular mode based on the detected intensity level of the ambient light data signal 250. In one example implementation, two different modes of operation are defined for the camera unit 148, which include a daytime mode and a low light mode. In other implementations, an additional flash mode of operation may also be defined. Still further modes of operation, such as full manual and flash override, may be defined as well. The number of possible modes of operation for the camera unit 148 is not limited.

The daytime mode of operation may be specified for use when the detected ambient light intensity falls within an upper range of ambient light intensities, which is defined over all ambient light intensities above an upper ambient light intensity threshold. The upper ambient light intensity threshold is not fixed and may be varied in different embodiments.

In an example implementation, the upper ambient light intensity threshold is defined at a level for which the ambient light provides sufficient luminance in the visible spectrum to produce digital color images with suitably low color noise. However, depending on how much color noise is tolerable in the resulting digital image, the upper ambient light intensity threshold may be raised or lowered accordingly to suit the user's preference. In some embodiments, the user has control over the upper ambient light intensity threshold through a corresponding input on the input/output interface (e.g., 112 in FIG. 1).

As the intensity of the available ambient light is diminished, the amount of color noise introduced to the resulting digital image begins to increase. Accordingly, when the ambient light intensity detected by the ambient light sensor 240 drops to a level below the upper ambient light intensity threshold (i.e. the minimum ambient light intensity specified for the daytime mode of operation), the camera controller 150 detects the low light condition and may automatically switch the camera unit 148 over to the low light mode of operation. As will be explained further below, in the low light mode of operation, the camera sensor sub-unit 158 employs one or more image processing techniques to compensate for some of the color luminance lost due to the low levels of ambient light and may thereby reduce the amount of color noise in the resulting digital image or video.

In some cases, the low light mode of operation is defined over all ambient light intensities below the upper ambient light intensity threshold. However, in other cases, the low light mode of operation is defined over the range of ambient light intensities below the upper ambient light intensity threshold, but above a lower ambient light intensity threshold that is defined at some level less than the upper ambient light intensity threshold. As with the daytime mode of operation, the range of ambient light intensities corresponding to the low light mode of operation is not fixed. For example, the upper ambient light intensity threshold and, optionally, also the lower ambient light intensity threshold may be user-selected using the input/output interface to suit the application.

The optional flash mode of operation may be reserved for extreme low light conditions, for which the luminance compensation performed in the low light mode is inadequate, unsatisfactory or otherwise undesired. Accordingly, the flash mode may be defined over all ambient light intensities below the lower ambient light intensity threshold. For these situations, the camera controller 150 may switch the camera unit 148 over to the flash mode and adapt the camera flash sub-unit 156 for operation in the flash mode. The camera flash sub-unit 156, which is responsive to a mode control signal 268 generated by the camera controller 150, is thereby activated during camera operation to expose the scene with artificial, e.g. LED-based, light for increased illumination. In other modes of operation, however, the camera flash sub-unit 156 may be deactivated.

In some embodiments, the input/output interface of the camera unit 148 may also provide a flash override feature with which the user can optionally activate or de-activate the camera flash sub-unit 156 in any selected mode of operation. For example, the user may activate the camera flash sub-unit 156 in the daytime or low light modes of operation. The camera flash sub-unit 156 may also be de-activated at the user's selection in cases of extreme low ambient light. This may be done to take long exposure pictures.

To select a particular mode of operation based on the detected ambient light intensity, the camera controller 150 continuously monitors the ambient light data signal 250 against one or more of the threshold levels marking the boundaries between the different camera modes of operation. For example, the camera controller 150 operates the camera unit 148 in daytime mode when the level of the ambient light data signal 250 is above the upper ambient light intensity threshold. Similarly the camera controller 150 may select the flash mode of operation, if pre-defined for the camera unit 148, when the level of the ambient light signal 250 is below the lower ambient light intensity threshold. The low light mode may then be selected when the level of the ambient light signal 250 is between the lower and upper ambient light intensity thresholds or, alternatively, when the level of the ambient light signal 250 is below the upper ambient light intensity threshold in cases where the flash mode is not pre-defined.

As shown in FIG. 4, the camera sensor sub-unit 158 includes both hardware components and software components for capturing and processing digital color images. In an example implementation, the camera sensor sub-unit 158 includes an image sensor 252, variable gain amplifier (VGA) 254, digital to analog converter (DAC) 256 and image sensor processor (ISP) 257. However, it should be appreciated that in variant embodiments, some of the components of the camera sensor sub-unit 158 shown in FIG. 4 may be re-allocated to one or more different modules. For example, some of the software and/or processing components of the camera sensor sub-unit 158, such as the image sensor processor 257, may be realized in other camera sub-units. The particular association of components in FIG. 4 is merely illustrative.

Image sensor 252 is a pixilated, photosensitive array used to capture scene images when exposed to light (both ambient and flash-based), such as by opening a camera shutter (not shown) within the camera lens sub-unit 154. For the duration that the camera shutter is opened, a camera lens (not shown) focuses light through an aperture onto the light sensor 252. The image sensor 252 captures the exposed image initially as raw sensor pixel data encoded into a sensor output signal 258.

The image sensor 252 may be synthesized on a single image sensor chip that has a plurality of pixels arranged into a square or rectangular array. Each pixel in the array includes at least one crystalline quantum dot layer that is photosensitive to a particular frequency range of the light spectrum. As will be appreciated, the photosensitivity of the individual pixels to different wavelengths of light may depend generally on the bandgap energy of the quantum dots used to fabricate the pixel. For crystalline quantum dot pixels, the bandgap energy is controllable with good precision based on the lattice spacing of the underlying crystalline quantum dot layer. Thus, photosensitivity may be controlled during fabrication as a function of lattice spacing.

A vertical stack of quantum dot layers may be used to fabricate pixels on the image sensor 252 having different spectral sensitivity. For example, the stack of quantum dot layers may include a top blue layer, a middle green layer, a middle red layer and a bottom infrared layer. Photons of light that are incident on the stack of quantum dot layers will be progressively absorbed into one of the quantum dot layers roughly corresponding to the color intensity of the incident light, depending on the specific bandgap energies of the various quantum dot layers. Thus, higher energy blue light is absorbed into the blue layer, while lower energy green light passes through to the underlying green layer wherein the lower energy green light is absorbed. Infrared light will almost entirely pass through the blue, green and red layers to reach the bottom infrared layer wherein the infrared light will be absorbed with good quantum efficiency. With this configuration of the quantum dot layers, the image sensor 252 may comprise pixels that separately detect each of blue, green, red and infrared light intensities.

However, in alternative embodiments, image sensor 252 may be realized instead using a charge-coupled device (CCD) or complementary metal oxide semiconductor (CMOS) sensor. Because the light sensitivity of CCD and CMOS sensors is typically not as controllable as quantum dot light sensors, color filters may be layered on top of the underlying CCD or CMOS substrate to provide selective photosensitivity to different wavelengths of light. In this way, the image sensor 252 again generates sensor output signal 258 consisting of raw sensor pixel data specific to different regions of the input light spectrum.

Often CMOS and CCD sensors include an infrared cutoff filter to improve the spectral selectivity of the color pixels because the overlaying color filters do not completely filter out infrared light. Where the image sensor 252 is fabricated using CMOS and CCD pixels, the infrared cutoff filter may be excluded to pass a usable amount of infrared light (that would otherwise be severely attenuated) through to the image sensor 252. Accordingly, a certain amount of infrared light may also be detected by other color pixels in the image sensor 252. To compensate at least in part for the infrared contamination, downstream image processing techniques may be applied.

The particular implementation of the image sensor 252 may vary in different embodiments to fit the application, depending on the desired performance of the camera unit 148 under low light conditions. While each above-described implementation of the image sensor 252 may be possible, quantum dot image sensors providing superior light gathering efficiency and spectral selectivity, in both the visible and infrared ranges, may be preferred for some embodiments.

Figure 5A:
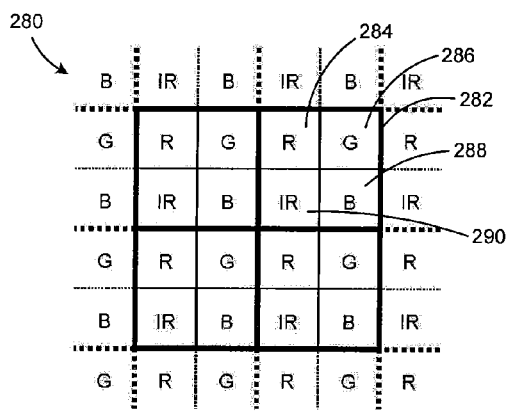
FIG. 5A is a schematic drawing of an example embodiment of the camera sensor of the camera unit shown in FIG. 4.
Figure 5C:
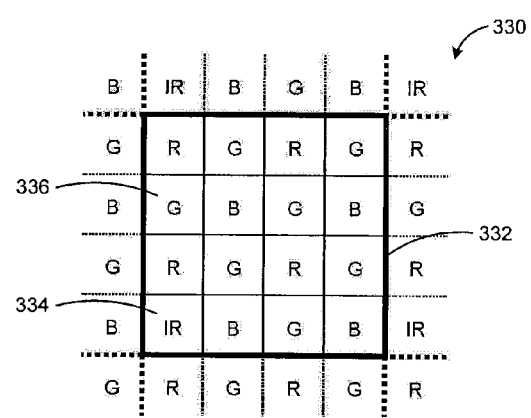
FIG. 5C is a schematic drawing of another example embodiment of the camera sensor of the camera unit shown in FIG. 4.
Figure 5B:
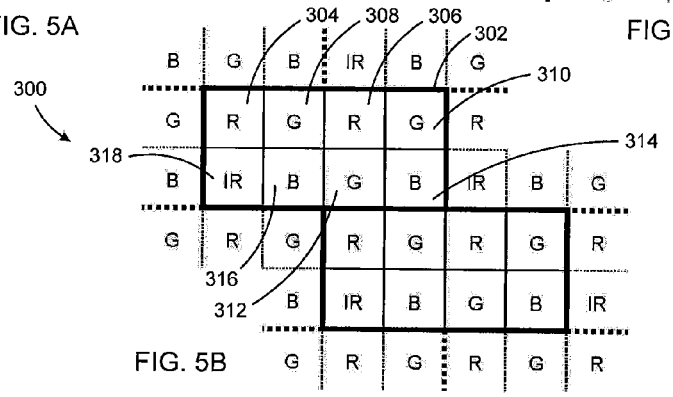
FIG. 5B is a schematic drawing of another example embodiment of the camera sensor of the camera unit shown in FIG. 4.

Referring now to FIGS. 5A-5C, some example pixel patterns for the image sensor 252 are shown. In each of the example patterns shown, the image sensor 252 is formed out of a combination of blue (B), green (G), red (R) and infrared (IR) pixels. The blue pixels may be fabricated to detect light predominantly within a range of wavelengths of between about 400 nm to 500 nm. Likewise the green pixels may be used to detect light predominantly within about 500 nm to 600 nm, while the red pixels may be sensitive to light predominantly within about 600 nm to 800 nm. With no infrared cut-off filter, the upper edge of the red pixel range may be bounded by the inherent cut-off of other materials in the image sensor 252, such as an underlying silicon substrate layer. However, it should be appreciated that these ranges are illustrative only and that each pixel may have a certain amount of spectral leakage (e.g, infrared contamination of CMOS or CCD color pixels).

The infrared pixels may be sensitive to one or more different sub-bands of infrared light, such as near infrared (NIR), short-wavelength infrared (SWIR), mid-wavelength infrared (MWIR), long-wavelength infrared (LWIR) or far infrared (FIR) ranges. However, as will be appreciated, the sensitivities noted specifically above for the B, G, R and IR pixels are illustrative only and may vary in different embodiments. An infrared cut-off filter often included in image sensor configurations to prevent exposure of the image sensor to infrared light is also omitted from the image sensor 252 in some embodiments, so that an appreciable amount of infrared light will reach the infrared pixels when the image sensor 252 is exposed, although as noted, exclusion of the infrared cutoff filter may cause some infrared contamination of the color pixels in some embodiments.

The particular pattern and corresponding relative proportions of the B, G, R and IR pixels are variable in different configurations of the image sensor 252 depending on different performance requirements of the image sensor 252. For example, increasing the relative proportion of infrared pixels may allocate more pixels in the image sensor 252 to detecting low light and thereby increase the low light resolution of the image sensor 252.

However, for a given fixed number of sensor pixels, the increased proportion of infrared pixels is provided by a corresponding decrease in the number of color (ie. R, G or B) pixels. With reduced color pixels, the color accuracy of the image sensor will generally decrease. Accordingly, increased infrared light resolution sometimes must be traded off against decreased color accuracy. The relative proportions of each type of pixel, infrared or color, is variable to meet these different performance requirements.

Additionally, while the particular kind of color pixel to be substituted with infrared pixels is optional, green pixels may conveniently be substituted for this purpose in some embodiments. In the standard Bayer color filter array (CFA), green pixels outnumber red and blue pixels two-to-one, as explained further below, and therefore have more inherent redundancy than red and green pixels.

The exemplary filter configurations in FIGS. 5A-5C are each based on the Bayer filter pattern, but modified to have some of the redundant green pixels substituted for infrared pixels. However, it should be appreciated that the image sensor 252 may have red and/or blue pixels substituted for infrared pixels in some cases, while in other cases the image sensor 252 may use a filter pattern other than the Bayer pattern as the base pixel pattern for the image sensor 252 in which infrared pixels are substituted.

FIG. 5A illustrates a pixel pattern 280 formed from a repeating 2×2 pixel block 282 in a regular grid formation, i.e. square edge-aligned. Each pixel block 282 uniformly includes a red pixel 284, a green pixel 286, a blue pixel 288 and an infrared pixel 290, in clockwise order starting with the red pixel 284 in the upper-left quadrant of the pixel block 282. Accordingly, the pixel pattern 280 is similar to the commonly employed Bayer CFA. However, the pixel pattern 280 differs from the Bayer CFA in that one of the redundant green pixels in the Bayer CFA is replaced with the infrared pixel 290. Thus, relative to the Bayer CFA, one of every four RGB color pixels in the pixel pattern 280 has been replaced with an infrared pixel. The relative positioning of each pixel is also not fixed and may be varied in different embodiments. For example, the green pixel 286 and the infrared pixel 290 may swap locations.

FIG. 5B illustrates a pixel pattern 300 that may be used as an alternative to the pixel pattern 280 of FIG. 5A. The pixel pattern 300 is formed from a repeating 2×4 pixel block 302 arranged in a staggered grid formation, i.e. because the short edge of a given 2×4 pixel block 302 is aligned with the long edge of an adjacent 2×4 pixel block 302 at the long edge midpoint. Each pixel block 302 includes two red pixels 304 and 306, three green pixels 308, 310 and 312, two blue pixels 314 and 316 and a single infrared pixel 318.

As seen from FIGS. 5A and 5B, the pixel pattern 300 is similar to two laterally adjacent pixel blocks 280, but with the green pixel 312 replacing one of the two infrared pixels 290. In this way, one of every eight RGB color pixels from the Bayer CFA pattern has been replaced with an infrared pixel in the pixel pattern 280. Again the relative positioning of the red, green, blue and infrared pixels is not fixed and may be varied.

FIG. 5C illustrates a third alternative pixel pattern 330 for the image sensor 252, in which one of every sixteen pixels is allocated to an infrared pixel. More specifically, pixel pattern 330 is formed from a repeating 4×4 pixel block 332 arranged in a regular grid formation. Each pixel block 332 includes four red pixels, seven green pixels, four blue pixels and a single infrared pixel 334. The pixel block 332 may be formed from two of the pixel blocks 302 shown in FIG. 5B, but with green pixel 336 replacing one of the two infrared pixels 318.

While three example pixel patterns 280, 300 and 330 have been described, the image sensor 252 is not limited to just these specifically noted patterns. Still other pixel patterns may be implemented involving variations on the relative positioning, as noted above, and/or proportions of RGB color and infrared pixels. The choice of a particular pixel pattern may depend on selected performance constraints of the image sensor 252, such as low light resolution and color accuracy. For increased low light resolution, a pixel pattern having a larger relative proportion of infrared pixels, such as pixel pattern 330, may be used. Similarly for increased color accuracy, a pixel pattern having a smaller relative proportion of infrared pixels, such as pixel pattern 280, may be chosen.

Referring back to FIG. 4, image sensor 252 generates the sensor output signal 258 encoding raw sensor data by sequentially sensing the electrical charge accumulated in each pixel of the image sensor 252 after exposure of the scene. The sensor output signal 258 is amplified by VGA 254 to generate an amplified sensor output signal 260. Digital to analog converter 256 then digitizes the amplified sensor output signal 260 to produce raw digital image data 262. For example, raw digital image data 262 may consist of a bitstream of different single component pixel values, with each single component pixel value sensed from a different pixel of the image sensor 252. The single component pixel values may be one of a raw red component value, raw green component pixel value, raw blue component pixel value and raw infrared component value, depending on the selective photosensitivity of the corresponding pixel.

The raw digital image data 262 is provided to the ISP 257 for processing to generate a processed digital image 264. The particular processing operations performed by the ISP 257 depend on the selected mode of operation for the camera unit 148, which the camera controller 150 communicates to the ISP 257 using the mode control signal 268. Generally these include de-mosaicing the single-component value, raw digital image data into full color image data represented by a set of color component values for each image pixel in the processed digital image 264. The color component values may be defined, for example, according to the commonly employed RGB, YUV, HSV, or CMYK color representations. The ISP 257 also determines an infrared component value associated with each image pixel.

The ISP 257 may also generally process the full color image data (e.g., RGB, YUV, HSV, CMYK component values) for each image pixel using the associated infrared component value, depending on the level of the ambient light, to increase the luminance SNR of the processed digital image 264. However, as will be explained, the ISP 257 may also directly augment the luminance component of each color image pixel at the stage of de-mosaicing by using infrared component values as weight factors. Optionally, the ISP 257 may also perform one or more additional image processing techniques, such as noise filtering, color correction, edge enhancement, and gamma correction on the image pixel color component values.

In one example implementation, the ISP 257 de-mosaics the single color component values in the raw digital image data 262, without weighting by the raw infrared component values, to calculate full color image data comprising a set of color component values associated with each image pixel in the processed digital image 264. Similarly the ISP 257 de-mosaics the raw digital image data 262 to calculate the associated infrared component value for each image pixel in the processed digital image 264. One or more pre-programmed de-mosacing algorithms, which may depend generally on the particular pixel configuration of the image sensor 252, may be used for this purpose.

To illustrate, the ISP 257 may de-mosaic the raw digital image data 262 generated by the pixel pattern 280 shown in FIG. 5A as follows. For each single-component sensor pixel in the image sensor 252, full color component values may be calculated by averaging each pixel of a certain color within the 3×3 grid centered on a given sensor pixel. Accordingly, looking at the red pixel 284, an associated green component color may be computed as the average of the left and right adjacent green pixels. Similarly an associated blue component may be computed as the average of the four diagonally adjacent blue pixels, and an associated infrared component may be computed as the average of the top and bottom adjacent infrared pixels. A similar process may be employed for calculating component values associated with the green pixel 286, blue pixel 288 and infrared pixel 290.

The ISP 257 then processes the full color image data (both color and IR component values) into the processed digital image 264, according to the selected mode of operation. For example, when the camera unit 148 is adapted for the daytime mode of operation, the ISP 257 disregards the infrared component values associated with each image pixel and generates the processed digital image 264 using only the associated color component values computed for each image pixel and not the associated infrared component values. As the raw image data 262 has already been de-mosaiced into a set of color component values, the ISP 257 may therefore determine final full color values for each image pixel of the processed digital image 264 directly from the determined color component values. Optionally, the ISP 257 may also apply one or more of the above-noted processing techniques, such as gamma correction, noise reduction, edge enhancement, and the like to determine the final full color values.

However, when the camera unit 148 is adapted for operation in the low light mode of operation, the ISP 257 determines final color values for each image pixel of the processed digital image 264 based on the associated color component values combined with the associated infrared component values. Different techniques for combining the color and infrared component values to render a fused digital image are possible.

For example, to enhance the luminance of the processed digital image 264 (and thereby increasing luminance SNR), the ISP 257 may augment an achromatic component value (sometimes also referred to as a "monochromatic" component value) of each image pixel using luminance information derived from the associated infrared component value to generate an augmented achromatic component value. Together with the remaining chromatic color component value(s) determined for each image pixel, the ISP 257 thereby generates augmented color component values for further processing, if any, into the processed digital image 264. This general approach is based partly on the human eye's increased sensitivity to variation in luminance (i.e., intensities) as opposed to chrominance (i.e., hues and saturations).

In some embodiments, to separate the color component values into an achromatic component and one or more chromatic components, the ISP 257 transforms the pixel color component values, such as RGB component values, associated with each image pixel into corresponding Hue (H), Saturation (S) and Value (V) component values. As will be appreciated, the RGB and HSV color models are two different, but equivalent, color representations with well-known forward and reverse transformations between each color model. In the HSV color space, Value represents an achromatic (i.e. intensity) component of each pixel, while Hue and Saturation are chromatic (i.e. color) components of each pixel. Transformations between HSV and other color representations (e.g. CYMK) are defined as well.

After transforming the pixel color component values into equivalent HSV color component values, the ISP 257 then combines the achromatic V component value for each image pixel with the associated IR component value to generate an augmented V component value. For each image pixel, the augmented V component value, denoted V*, replaces the original V component value generated from the transformation into HSV component values. Together with the original H and S component values from the transformation, the luminance augmented HSV* component values are transformed back into augmented color component values. Depending on the utilized color representation for the processed digital image, the augmented color component values will generally differ from the original color component values generated through de-mosiacing of the raw digital image data 262. The ISP 257 then generates the processed digital image 264 from the augmented color component values.

In some embodiments, the ISP 257 generates the augmented achromatic component value, for each image pixel in the processed digital image 264, as a linear combination of the achromatic V component value and the infrared component value. Accordingly, the ISP 257 may produce the augmented achromatic component value as a weighted average of the achromatic and infrared component values. In some embodiments, the augmented achromatic color value may be taken directly as the infrared component value.

Alternatively, the ISP 257 may generate the augmented achromatic component value through a non-linear transformation of the achromatic component value and the infrared component value. For example, the ISP 257 may use a non-linear averaging of the achromatic and infrared component values, which may include computing squares of higher powers of these component values. Other examples of non-linear transformations to render fused color and infrared images, intended only to be illustrative, are described in the following published references:

G. Li and K. Wang, *An Efficient Natural-Looking Color Fusion Method of Infrared and Visible Images,* 2006 IEEE Region 10 Conference, Hong Kong, November 2006.

F. Sun et al., *A New Color Image Fusion Method for Visible and Infrared Images,* IEEE International Conference on Robotics and Biomimetics, Sanya, China, December 2007.

Q. Zhang and B Guo, *Infrared and Color Visible Images Fusion Based on Second Generated Curvelet Transform,* 2nd IEEE Conference on Industrial Electronics and Applications, Harbin, China, May 2007.

X. Zhang et al., *Fusion of the Infrared and Color Visible Images Using Bidimensional EMD,* International Conference on MultiMedia and Information Technology, Three Gorges, China, December 2008.

X. Zhang et al., *Comparison of Fusion Methods for the Infrared and Color Visible Images,* 2nd IEEE International Conference on Computer Science and Information Technology, Beijing, China, August 2009.

As an alternative to the ISP 257 processing the full color (i.e., de-mosaiced) image data by combining the associated infrared component values with achromatic component values, in some embodiments, the ISP 257 instead determines pre-augmented final color values directly at the time of de-mosaicing of the raw digital image data 262. In these alternative configurations, the ISP 257 may determine the final color values for each image pixel differently according to the selected mode of operation for the camera unit 148.

When the camera controller 150 selects the daytime mode of operation, the ISP 257 de-mosaics the raw image data 262 substantially as described above by, for example, averaging raw component values inside of the 3×3 block of pixels centered on each sensor pixel. In this mode of operation, raw infrared component values may be ignored by the de-mosaicing algorithm used by the ISP 257.

On the other hand, when the camera controller 150 selects the low light mode of operation, the ISP 257 de-mosaics raw color component values weighted by proximately located raw infrared component values. For example, the final de-mosaiced set of color component values for each image pixel of the processed digital image 264 may be determined as a linear combination of a given raw color (i.e., RGB) component value and the proximately located raw infrared component values. In this fashion, the ISP 257 increases the luminance of the processed digital image 264 based on the level of detected infrared light.

In some example implementations, the ISP 257 detects the intensity of the ambient light instead of the ambient light sensor 240, in which case the ambient light sensor sub-unit 152 is optional and may be omitted. To detect the intensity of the ambient light, the ISP 257 may compare some measure of the magnitude of the single color component values in the raw digital image data 262 against a threshold value, which can be a noise threshold. For example, the ISP 257 may compare any of a minimum, maximum or average single component value against the threshold value.

If the ISP 257 detects that the intensity of the ambient light is low, the processed digital image 264 may be generated, as described above, by augmenting color component values with infrared component values. However, if the ambient light intensity is high, the ISP 257 may generate the processed digital image 264 using color component values and not infrared component values.

In another example implementation, the ambient light sensor 240 is configured to detect a color temperature of the ambient light, in which case the ambient light data signal 250 is also representative of the ambient light color temperature. For example, the ambient light data signal 250 may be a multi-dimensional signal comprising two separate signal components, one for each of the intensity and color temperature of the detected ambient light. Alternatively, the ambient light sensor sub-unit 152 may generate separate signals to represent the intensity and color temperature of the detected ambient light.

Certain objects exhibit a high degree of infrared luminance even though appearing comparatively dark to visible light. If the image sensor 252 images one of these bright infrared objects, when the ISP 257 processes the raw digital image data 262 based on the levels of infrared light to increase luminance, rendering artifacts may be introduced into the processed digital image 264. To prevent or reduce the impact of such occurrence, when operating in the low light mode of operation, the ISP 257 may also compensate for the unusually bright infrared luminance of some imaged objects.

To reduce the appearance of rendering artifacts, in some embodiments, the camera sensor sub-unit 158 further includes a database 266 that is accessible to the ISP 257. The database 266 is used to store database entries corresponding to objects known, or otherwise ascertained, to exhibit unusually high infrared luminance. Each database entry is associated with a particular image object and includes one or more associated records. For example, each database entry may include an associated record of an intensity pattern that corresponds approximately to the shape of the imaged object, an associated record of a color temperature of the ambient light in which the object typically appears, and an adjustment factor. For example, the intensity pattern can reflect concentrations of one or both of infrared and color intensities. The infrared intensity can roughly correspond to the shape or profile of the object, while the color intensity can correspond to the background or negative space defined by the object.

During operation in the low light mode, or any other mode in which infrared augmentation of the processed digital image 264 is utilized, the ISP 257 accesses the database entries stored in the database 266 to match the scene object captured by the image sensor 252 with one of the database entries. If the ISP 257 finds a matching entry for the imaged object, the infrared component values in the raw digital image data 262 (or alternatively the de-mosaiced, full color image data) are then reduced by the adjustment factor associated with the database entry to produce adjusted image data before further processing by the ISP 257. Thereafter, the ISP 257 may process the adjusted image data as described above to generate the processed digital image 264 having infrared enhanced color luminance.

In order to find a matching database entry for the imaged object, the ISP 257 may correlate one or more component values (infrared and/or color) in the raw digital image data 262 with the stored intensity pattern. Additionally, the ISP 257 may compare the stored color temperature associated with the intensity pattern against the detected color temperature of the ambient light, as indicated by the ambient light data signal 250. When the ISP 257 correlates the one or more component values with the stored intensity pattern, and which occurs at the expected color temperature for the stored object pattern, the ISP 257 registers a positive object match and applies the associated adjustment factor to the reduce the level of the raw infrared component values produced by the image sensor 252. As will be appreciated, in some cases, no object match is identified even though the imaged object has a corresponding intensity pattern stored in the database 266.

In some embodiments, the camera controller 150 may also generate a graphic for display on the input/output interface (e.g. 110 in FIG. 1) based on the ambient light data signal 250 to represent the detected color temperature of the ambient light. In addition to intensity, the detected color temperature of the ambient light presented to the user also provides a basis for selecting between one of the different modes of operation defined for the camera unit 148. For example, based on the detected color temperature, the user may select a mode of operation intended to provide "cooler" or "warmer" colors in the processed digital image 264.

Figure 6:
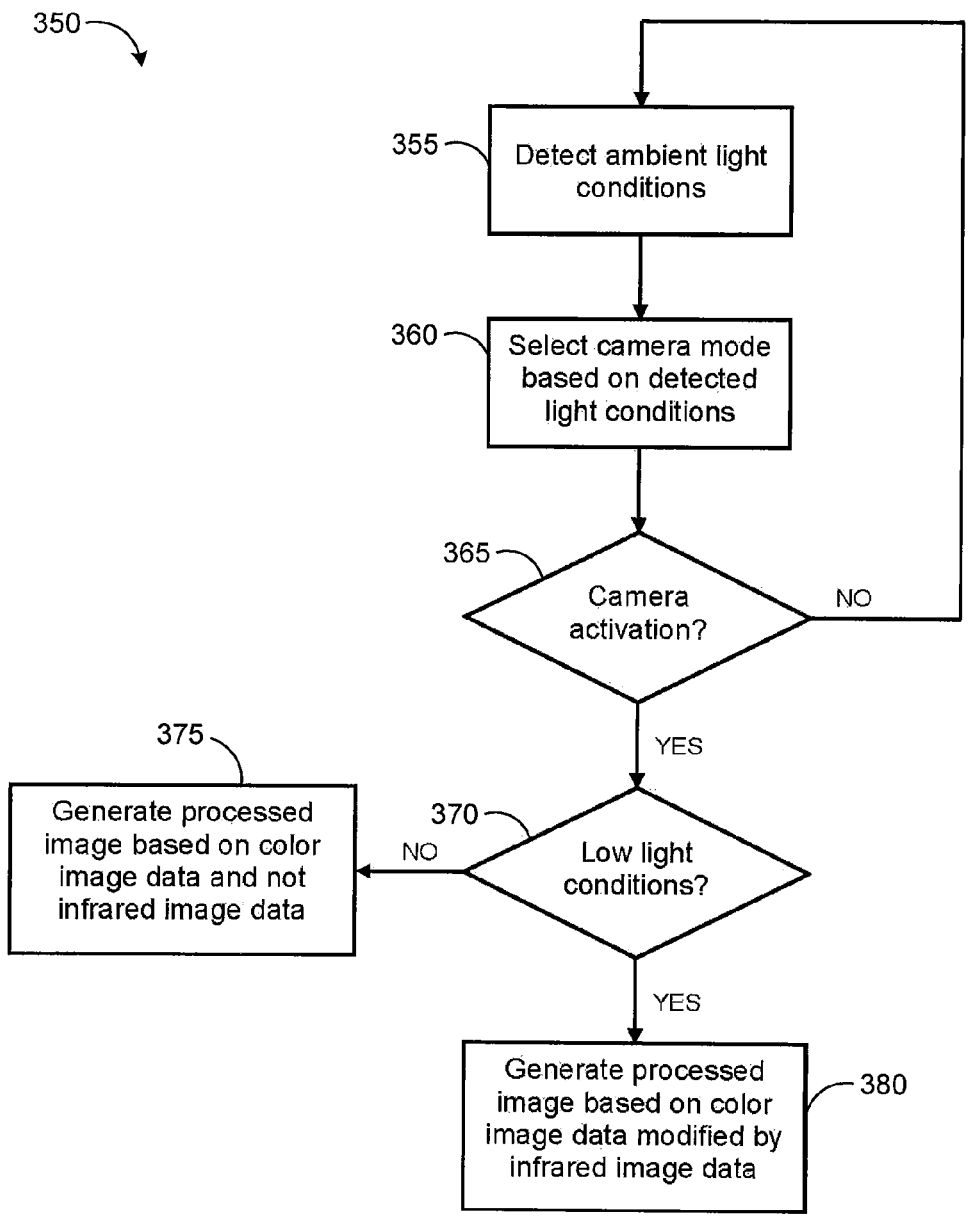
FIG. 6 is a flow chart showing a method for controlling the camera unit of the mobile device shown in FIG. 1.

Referring now to FIG. 6, there is illustrated a method 350 for controlling a camera unit to generate a processed digital image. The method 350 is computer implemented and may be performed by one or more components of the camera unit 148 shown in FIG. 4, such as the camera controller 150 and the image sensor processor 257. Accordingly, the following description of method 350 may be abbreviated for clarity. Further details of the method 350 are provided above with reference to FIG. 4.

At 355, ambient light conditions in the vicinity of the camera unit are detected. An intensity and, optionally, a color temperature of the ambient light may be detected, for example, using an ambient light sensor comprising a photovoltaic or photoresistive layer.

At 360, a mode of operation for the camera unit is selected based upon the detected conditions of the ambient light, such as the intensity or color temperature of the ambient light. The particular mode of operation may be selected manually by a user of the camera unit using information related to the detected light conditions, which is display or otherwise provided on an input/output interface. Alternatively, the mode of operation may be selected automatically without user input by one or more components of the camera unit, such as the camera controller and/or the image sensor processor.

Multiple modes of operation for the camera unit may be defined. These modes of operation may include a daytime mode and a low light mode. The daytime mode of operation may be selected when the detected ambient light intensity is above an upper ambient light intensity threshold, while the low light mode of operation may be selected when the detected ambient light intensity is below the upper ambient light intensity threshold. For automatic mode selection by the camera unit, each possible mode of operation may be defined based on the level of the ambient light intensity in relation to one or more ranges of ambient light intensities.

Optionally, a flash mode of operation may also be defined for the camera unit and selected when the detected ambient light intensity is below a lower ambient light intensity threshold. In such cases, the low light mode may be selected when the detected ambient light intensity is between the lower and upper ambient light intensity thresholds. Camera flash may also be overridden by the user in extreme low light conditions, if desired, for example to produce long exposure images. Camera flash can also be manually enabled in any mode of operation, if desired.

At 365, the camera unit is polled for camera activation input, indicating that a camera exposure has been initiated. If no camera activation input is received, the method 350 branches back to 355 for detection of new ambient light conditions. However, if camera activation input is received at 365, the method 350 branches to 370 where it is determined whether or not the camera exposure occurred during low light conditions. Based upon the outcome of the determination at 370, the digital image resulting from the camera exposure may be processed differently.

If it is determined at 370 that the camera exposure did not occur in low light conditions, the method 350 branches to 375 and the processed digital image is generated using only color image data provided by an image sensor of the camera unit. As explained above with reference primarily to FIG. 4, this may involve de-mosaicing raw image data to generate color component values for each image pixel in the processed digital image, while discarding infrared component values also generated by the image sensor. Optionally, additional image processing functions, such as edge enhancement and gamma correction, may be performed.

On the other hand, if it is determined at 370 that the camera exposure did occur in low light conditions, the method 350 branches to 380 and the processed digital image is generated by augmenting the color image data from the image sensor with the infrared image data. As explained above with reference primarily to FIG. 4, this may involve transforming color component values, such as RGB component values, into equivalent component values of an alternative color space to isolate an achromatic component value of each image pixel. The achromatic component value is then combined with a corresponding infrared component value to generate an augmented achromatic component value. Together with one or more chromatic component values defined in the alternative color space, the augmented achromatic component value is transformed back into the original color space to generate augmented color component values. Then the processed digital image is produced from the augmented color component values.

Alternatively, at 380, processed color component values may be generated directly at the stage of de-mosaicing raw image data by using infrared component values of proximately located pixels as weighting factors for color component values of the proximately located pixels. In either case, the processed digital image augmented by infrared image data may have increased luminance SNR than would otherwise have been achieved using only color image data. After 375 or 380, method 350 may return to 355 for detection of ambient light conditions.

As an alternative to the determination at 370, rather than the camera unit automatically selecting a mode of operation based on the detected level of ambient light conditions, the mode of operation may be user-selected at 370. Accordingly, method 350 may branch to 375 or 380 based upon the user-selected mode of operation.

Although primarily described in the context of digital still images, with suitable modification, the method 350 may also be used to generate digital video images that are luminance enhanced by infrared data.

Some example embodiments have been described herein with reference to the drawings and in terms of certain specific details to provide a thorough comprehension of the described embodiments. However, it will be understood that the embodiments described herein may be practiced in some cases without one or more of the described aspects. In some places, description of well-known methods, procedures and components has been omitted for convenience and to enhance clarity. It should also be understood that various modifications to the embodiments described and illustrated herein might be possible. The scope of the embodiments is thereby defined only by the appended listing of claims.

The invention claimed is:

1. A control system for a camera unit to generate a processed digital image represented by a plurality of image pixels, the control system comprising:
    an ambient light sensor for generating an ambient light data signal representative of an intensity of ambient light detected;
    a camera controller coupled to the ambient light sensor and for adapting the camera unit to a mode of operation selected from a plurality of modes of operation defined for the camera unit in relation to the intensity of the detected ambient light, the plurality of modes of operation comprising a first mode of operation and a second mode of operation; and
    a camera sensor coupled to the camera controller to receive a control signal generated by the camera controller indicating the selected mode of operation, the camera sensor comprising:
        an image sensor comprising a plurality of pixels for providing image data representing a scene image exposed to the image sensor, the image data comprising color image data and infrared image data; and an image sensor processor responsive to the control signal to process the image data into the processed digital image, according to the selected mode of operation, by determining a plurality of processed color component values used to represent full colors in the processed digital image, for each image pixel of the processed digital image (i) in the first mode of operation, based on the color image data without using the infrared image data, and (ii) in the second mode of operation, based on the color image data modified by the infrared image data.

2. The control system of claim 1, wherein the image sensor processor is configured to
de-mosaic the image data into pre-processed image data comprising each of a plurality of color component values and an infrared component value associated with each image pixel of the processed digital image; and
when the second mode of operation is selected, for each image pixel of the processed digital image, determine the plurality of processed color component values by augmenting an achromatic component value, derivable from the associated plurality of color component values, based on the associated infrared component value to provide an augmented achromatic component value.

3. The control system of claim 2, wherein the image sensor processor is configured to determine the plurality of processed color component values, for each image pixel of the processed digital image, by
transforming the associated plurality of color component values into a plurality of equivalent component values comprising the achromatic component value and a plurality of chromatic component values;
combining the achromatic component value and the infrared component value to generate the augmented achromatic component value; and
transforming the augmented achromatic component value and the plurality of chromatic component values into the plurality of processed color component values.

4. The control system of claim 3, wherein the image sensor processor is configured to generate the augmented achromatic component value, for each image pixel of the processed digital image, as a weighted average of the achromatic component value and the infrared component value.

5. The control system of claim 3, wherein the image sensor processor is configured to generate the augmented achromatic component value, for each image pixel of the processed digital image, as a non-linear transformation of the achromatic component value and the infrared component value.

6. The control system of claim 1, wherein the image sensor processor is configured to generate the plurality of processed color component values, according to the selected mode of operation, for each image pixel of the processed digital image, by de-mosaicing the image data (i) in the first mode of operation, based on color component values provided by proximately located sensor pixels on the image sensor without using infrared component values provided by the proximately located sensor pixels, and (ii) in the second mode of operation, based on the color component values provided by the proximately located sensor pixels weighted by at least one infrared component value provided by the proximately located sensor pixels to increase luminance in the processed digital image.

7. The control system of claim 1, wherein the camera controller is coupled to the ambient light sensor to receive the ambient light data signal, and is configured to monitor a level of the ambient light data signal; and
automatically select the mode of operation for the camera unit based upon the level of the ambient light data signal in relation to a plurality of ambient light intensity ranges defined for the ambient light data signal, each ambient light intensity range corresponding to a different mode of operation defined for the camera unit.

8. The control system of claim 7, wherein the camera controller is configured to select the first mode of operation for the camera unit when the level of the ambient light data signal is above an upper ambient light intensity threshold.

9. The control system of claim 8, wherein the camera controller is configured to select the second mode of operation for the camera unit when the level of the ambient light data signal is below the upper ambient light intensity threshold.

10. The control system of claim 9, wherein the camera controller is configured to
select the second mode of operation when the level of the ambient light data signal is above a lower ambient light intensity threshold less than the upper ambient light intensity threshold; and
select a third mode of operation for the camera unit from the plurality of modes of operation when the level of the ambient light data signal is below the lower ambient light intensity threshold; and
wherein the control system comprises a camera flash sub-unit coupled to the camera controller, the camera flash sub-unit responsive to the control signal to generate a camera flash during exposure of the image sensor, when the third mode of operation is selected, to increase the intensity of the ambient light.

11. The control system of claim 1, wherein the ambient light data signal is further representative of a color temperature of the detected ambient light, and wherein the image sensor processor is configured to adjust the infrared component value associated with at least one image pixel based on the detected color temperature of the ambient light.

12. The control system of claim 11, wherein the camera sensor further comprises a database accessible to the image sensor processor for storing a plurality of database entries comprising records associated with a corresponding plurality of stored image objects, and
wherein the image sensor processor is configured to correlate the scene image exposed to the image sensor to one or more of the stored image objects, and process the infrared image data based on the records associated with the one or more stored image objects correlated to the scene image.

13. The control system of claim 12, wherein each database entry comprises a light intensity pattern representing a stored image object in the plurality of stored image objects, a associated color temperature of the stored image object and an associated adjustment factor for the light intensity pattern, and wherein the image sensor processor is configured, when in the second mode of operation, to process the associated infrared component values of the plurality of image pixels based on the detected color temperature of the ambient light by
matching a plurality of the associated infrared component values to the light intensity pattern of the one or more correlated image objects stored in the database and the color temperature of the detected ambient light to the color temperature associated with the one or more correlated image objects;
adjusting at least one of the plurality of associated infrared component values using the associated adjustment factor for the matched light intensity pattern to generate adjusted infrared image data; and processing the adjusted infrared image data to generate the processed digital image.

14. The control system of claim 1, wherein the camera unit further comprises an input/output interface for graphically representing an intensity of the detected ambient light and for receiving selection input of the mode of operation for the camera unit.

15. A method for controlling a camera unit to generate a processed digital image represented by a plurality of image pixels, the method comprising:
detecting an intensity of ambient light;
receiving image data representing a scene image exposed to an image sensor, the image data comprising color image data and infrared image data;
adapting the camera unit to a mode of operation selected from a plurality of modes of operation defined for the camera unit in relation to the detected ambient light intensity, the plurality of modes of operation comprising a first mode of operation and a second mode of operation; and
processing the image data into the processed digital image, using an image sensor processor, according to the selected mode of operation, by determining a plurality of processed color component values used to represent full colors in the processed digital image, for each image pixel of the processed digital image (i) in the first mode of operation, based on the color image data without using the infrared image data, and (ii) in the second mode of operation, based on the color image data modified by the infrared image data.

16. The method of claim 15, further comprising
de-mosaicing the image data into pre-processed image data comprising each of a plurality of color component values and an infrared component value associated with each image pixel of the processed digital image; and
when the second mode of operation is selected, for each image pixel of the processed digital image, determining the plurality of processed color component values by augmenting an achromatic component value, derived from the associated plurality of color component values, with the associated infrared component value.

17. The method of claim 16, further comprising determining the plurality of processed color component values, for each image pixel of the processed digital image, by
transforming the associated plurality of color component values into a plurality of equivalent component values comprising the achromatic component value and a plurality of chromatic component values;
combining the achromatic component value and the infrared component value to generate an augmented achromatic component value; and
transforming the augmented achromatic component value and the plurality of chromatic component values into the plurality of processed color component values.

18. The method of claim 17, further comprising generating the augmented achromatic component value, for each image pixel of the processed digital image, as a weighted average of the achromatic component value and the infrared component value.

19. The method of claim 17, further comprising generating the augmented achromatic component value, for each image pixel of the processed digital image, as a non-linear transformation of the achromatic component value and the infrared component value.

20. The method of claim 15, further comprising generating the plurality of processed color component values, according to the selected mode of operation, for each image pixel of the processed digital image, by de-mosaicing the image data (i) in the first mode of operation, based on color component values provided by proximately located sensor pixels on the image sensor without using infrared component values provided by the proximately located sensor pixels, and (ii) in the second mode of operation, based on the color component values provided by the proximately located sensor pixels weighted by at least one infrared component value provided by the proximately located sensor pixels to increase luminance in the processed digital image.

21. The method of claim 15, further comprising
monitoring a level of the ambient light intensity; and
automatically selecting the mode of operation for the camera unit based upon the monitored level of the ambient light intensity in relation to a plurality of ambient light intensity ranges, each ambient light intensity range corresponding to a different mode of operation defined for the camera unit.

22. The method of claim 21, further comprising selecting the first mode of operation for the camera unit when the monitored level of the ambient light intensity is above an upper ambient light intensity threshold.

23. The method of claim 22, further comprising selecting the second mode of operation for the camera unit when the monitored level of the ambient light intensity is below the upper ambient light intensity threshold.

24. The method of claim 23, further comprising
selecting the second mode of operation when the monitored level of the ambient light intensity is above a lower ambient light intensity threshold less than the upper ambient light intensity threshold;
selecting a third mode of operation for the camera unit from the plurality of modes of operation when the monitored level of the ambient light intensity is below the lower ambient light intensity threshold; and
when the third mode of operation is selected, generating a camera flash during exposure of the image sensor to increase the ambient light intensity.

25. The method of claim 15, further comprising detecting a color temperature of the ambient light, and adjusting the infrared component value associated with at least one image pixel based on the detected color temperature of the ambient light.

26. The method of claim 25, further comprising
storing a plurality of database entries comprising records associated with a corresponding plurality of stored image objects;
correlating the scene image exposed to the image sensor to one or more of the stored image objects; and
processing the infrared image data based on the records associated with the one or more stored image objects correlated to the scene image.

27. The method of claim 26, wherein each database entry comprises a light intensity pattern representing a stored image object in the plurality of stored image objects, a associated color temperature of the stored image object and an associated adjustment factor for the light intensity pattern, and the method further comprises, when the second mode of operation is selected, processing the associated infrared component values of the plurality of image pixels based on the detected color temperature of the ambient light by
matching a plurality of the associated infrared component values to the light intensity pattern of the one or more correlated image objects and the color temperature of the detected ambient light to the color temperature associated with the one or more correlated image objects;

adjusting at least one of the plurality of associated infrared component values using the associated adjustment factor for the matched light intensity pattern to generated infrared adjusted image data; and processing the infrared adjusted image data to generate the processed digital image.

28. The method of claim 15, further comprising graphically representing the detected ambient light intensity on an input/output interface of the camera unit; and selecting the mode of operation for the camera unit on the input/output interface.

29. A non-transitory computer-readable storage medium storing instructions executable by one or more processors coupled to the storage medium, the stored instructions when executed for programming the one or more processors to control a camera unit to generate a processed digital image represented by a plurality of image pixels, the stored instructions comprising:

detecting an intensity of the ambient light;

receiving image data representing a scene image exposed to an image sensor, the image data comprising color image data and infrared image data;

adapting the camera unit to a mode of operation selected from a plurality of modes of operation defined for the camera unit in relation to the detected ambient light intensity, the plurality of modes of operation comprising a first mode of operation and a second mode of operation; and processing the image data into the processed digital image, using the one or more processors, according to the selected mode of operation, by determining a plurality of processed color component values used to represent full colors in the processed digital image, for each image pixel of the processed digital image (i) in the first mode of operation, based on the color image data without using the infrared image data, and (ii) in the second mode of operation, based on the color image data modified by the infrared image data.

* * * * *